J. M. PEERSON.
HULLING AND CLEANING FEEDER FOR COTTON GINS.
APPLICATION FILED MAR. 19, 1920.

1,396,142.

Patented Nov. 8, 1921.

INVENTOR
J.M. PEERSON.
BY
ATTORNEY

UNITED STATES PATENT OFFICE.

JAMES M. PEERSON, OF FLORENCE, ALABAMA.

HULLING AND CLEANING FEEDER FOR COTTON-GINS.

1,396,142.   Specification of Letters Patent.   Patented Nov. 8, 1921.

Application filed March 19, 1920. Serial No. 367,199.

*To all whom it may concern:*

Be it known that I, JAMES M. PEERSON, a citizen of the United States of America, residing at Florence, in the county of Lauderdale and State of Alabama, have invented certain new and useful Improvements in Hulling and Cleaning Feeders for Cotton-Gins, of which the following is a specification.

My invention relates to a hulling and cleaning feeder for cotton gins and is especially designed to permit the heavier particles of foreign matter to be thrown off centrifugally from the mass of cotton on the feeder drum and by a novel means to permit such particles to escape so as not thereafter to mingle with the cotton or waste in the hulling chamber.

A further object of my invention is to arrange picker rolls below the feeder drum so that the hulls and foreign matter removed thereby from the cotton on the feeder drum will fall by gravity to the hulls or waste exit and not thereafter have opportunity to mingle with the cotton.

A further object of my invention is to provide novel hulling ribs which are substantially triangular in cross section, taper from base to tip, and present a concave face toward the oncoming cotton. These ribs are mounted upon an adjustable bar which regulates their angular relation to the oncoming cotton and the juxtaposition of their tips to the spiked feeder drum.

A further object is to interpose between the overhead means, which permits the escape of the heavier foreign matter, and the picker rolls, a fast spinning brush, preferably of flexible steel, which will act to whip the cotton toward and pack it between the teeth of the feeder drum, and which will also cut the leaves and trash into smaller particles to facilitate their falling out of the cotton or being removed by the picker rolls, it being noted that my apparatus is especially designed to take advantage wherever possible by gravity for the separation of foreign matter from the cotton.

My invention further comprises the novel details of construction and arrangements of parts, which in their preferred embodiment are illustrated in the accompanying drawings, in which :—

Similar reference numerals refer to similar parts throughout the drawings.

Figures 1, 4:
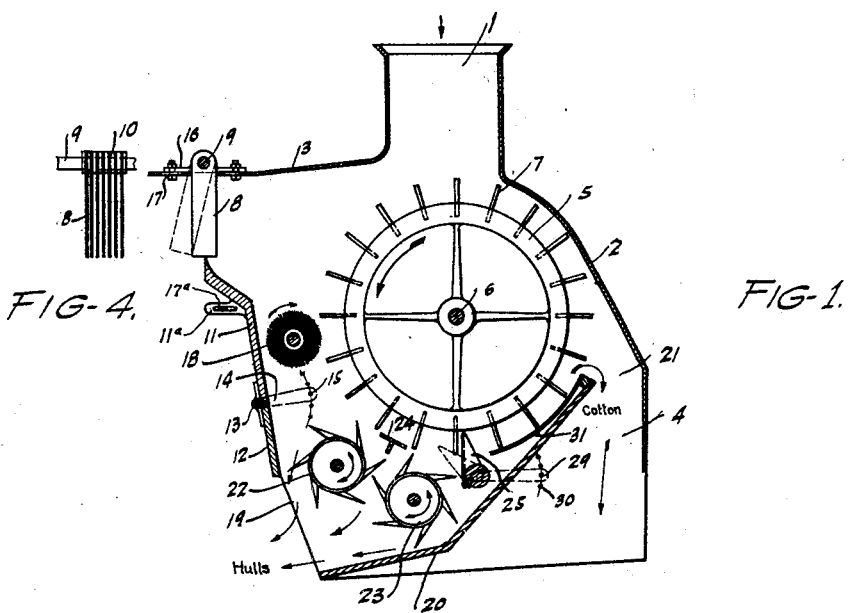
Figure 1 is a vertical sectional view through a typical hulling and cleaning feeder constructed in accordance with my invention, the gin supplied with coton thereby being omitted.
Fig. 4 is a partial view of the swinging bars which permit the escape of heavier particles expelled centrifugally from the cotton on the feeder drum.

In the embodiment of my invention illustrated, I show a typical cleaning and hulling feeder for gins such as is customarily mounted on top of the gin and which receives a slow and uniform feed of cotton in any suitable manner. This cotton enters through the top feed opening 1 in the cleaner and huller casing which comprises a front wall 2, a top wall 3 and side walls 4. The feeder drum 5 is of ordinary spiked type, being mounted on a shaft 6 which is driven in any suitable manner in the direction of the arrow and which has radial spikes 7 projecting from its periphery and adapted to receive the cotton as it falls through the inlet opening 1 onto the drum. The drum is rotated at a high speed so that as the cotton is grasped by the drum spikes and thrown to the left, the heavier particles of foreign matter, such as rocks, stones and unopened bolls, being projected from the cotton by a centrifugal force at a high speed and caused to strike against a set of swinging bars 8. These bars are closely associated upon a shaft 9 having spacer washers 10 interposed between them and they are freely mounted on the shaft so that they will swing readily outwardly under the impact of any heavier matter than the cotton. It will be noted that the bars as they hang normally stand above a rear board partition 11 which forms an adjustable back wall for the casing and has its bottom edge 12 hinged at 13 and controlled by an arm 14 which is made fast in the desired adjusted position by a pin 15 working in a suitable hole of a series in a side wall 4 of the casing. The shaft 9 is mounted in bearings 16 which are adjustable in slots 17 in the top wall 3 so as to set the bars 8 at a distance from the drum which will give the best operating results. This adjustment of the bar is small and can be generally taken care of without an adjustment of the board 11, it being observed that the upper tip of this board stands under the centers of the hanging bars, thus permitting the bars, according to their width, to be adjusted to the left or right and still overhanging the upper tip of the board 11. The slot 17$^a$ in arm 11$^a$ is provided to permit adjustment of the board 11 on its fastenings which pass therethrough. Each bar 8 swings freely and independently of all the others.

Between the board 11 and the drum in approximately the same horizontal plane as the shaft 6, is a fast spinning brush 18 composed of flexible steel wires which are fast to a center shaft and are rotated thereby so as to perform two functions, namely, to drive the cotton toward and compress it between the teeth 7 on the drum, and by their whipping action to cut or break up the leaves and particles of the trash in the cotton and throw such particles back against 11 or 12 so that they will tend to slide down the latter and pass directly out through the trash or hull outlet 19 formed between the bottom end 12 of the board 11 and the trash chute 20 which extends, generally speaking, with an upward inclination toward the front wall 2 and terminates at the cotton outlet opening 21 from the drum chamber.

Figures 2, 3:
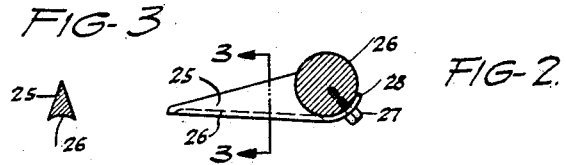
Fig. 2 is an enlarged detail view of a hulling rib.
Fig. 3 is a sectional view taken on the line 3—3 of Fig. 2.

Below the feeder drum and between it and the hull outlet 19, I interpose a pair of picker rolls 22 and 23, which are driven in reverse directions and provided with radial spikes forming picker teeth. These teeth on the adjacent rolls are relatively staggered so as to travel between each other and their paths of travel are close to but do not intersect the paths of travel of the drum spikes 7. Between the two picker rolls and the drum I interpose a transverse T-bar 24 set with its wide upper face toward the drum and its web in a plane substantially midway between the picker rolls. Substantially under the bottom of the feeder drum I mount a series of hulling ribs 25. These ribs, as shown more clearly in Figs. 2 and 3, are formed with a concave face 26 toward the oncoming cotton which tapers in width from base to tip. The base of the ribs are cut out in a semicircle to fit snugly about a rocker shaft 26 to which they are made fast by set screws 27 passing through a base flange 28 of the rib. The shaft 26 is made fast at its outer end to a crank or handle 29 which can be set to the desired adjustment by a pin working in a series of holes 30 in the side wall 4. Any other adjusting means for the rocker shaft may be employed.

Between the ribs 25 and the cotton outlet 21 I interpose a screen 31 made fast to the side walls of the casing and conforming closely to the curved path of travel of the feeder drum spikes.

The operation of my invention is as follows. Having adjusted the several parts for the desired operation, cotton is introduced through the inlet 1. It is engaged by the feeder drum 5 and thrown against the board 11, any heavier foreign matter tending to strike the bars 8 which yield to the impact of such heavier particles or closed bolls, but resisting the impact of the cotton or open cotton bolls. Generally speaking, the heavier the particles the higher it will be thrown, so that in practice only the heavier foreign matter and particles will normally strike the bars 8, the lighter cotton striking the board 11 and the brush 18 and being engaged by the latter and pressed into the spikes 7 on the feeder drum so that the cotton, after passing the roll 18, is packed between such spikes. The cotton tending to fall away from the drum spikes is engaged by the picker roll 22 so that it passes over the T-bar 24 with the drum spikes and is engaged by the ribs 25 which work with their tips at the desired distance from the drum according to the condition of the cotton. The hulls or foreign matter taken out of the cotton by the ribs 25 falls in front of the picker roll 23 onto the trash chute 20, the picker roll 23 preventing any cotton going out with the hulls, and in like manner the picker roll 22 prevents any cotton going out with the hulls which work down the board 11 and pass off between its adjustable end 12 and to said picker roll 22. When the cotton is abnormally full of hulls, the end board 12 is adjusted farther from the picker roll 22 than is normally the case.

The advantage of the groove 26 in the ribs 25 is to provide sharpened side cutting edges and to better guide downwardly any foreign matter engaging it under centrifugal force from the feed drum. The ribs 25 are intended to be adjusted by means of the handle 29 into the desired operating relation of the feeder drum, that shown being best suited for rough or dirty cotton, whereas they can be dropped to the dotted position for clean cotton so that the cleaner mass of cotton next to the drum is not so much disturbed in passing the huller ribs. It is to be noted that all parts are arranged to take advantage of gravity in maintaining separate from the cotton all hulls or foreign matter expelled centrifugally therefrom or whipped or otherwise taken out of the mass of the cotton by the brush 18 or picker rolls 22 and 23 so that I am enabled to obtain a very clean product for feeding to the gin.

Having thus described my invention, what I claim as new and desire to secure by Letters Patent, is:—

1. The combination of a gin feeder and cleaner casing having a plurality of openings, of a series of independently movable freely swinging elements mounted in close association to form a closure for one of said openings, and a rotating feeder drum disposed to project centrifugally foreign matter in the cotton against said elements, as and for the purposes described.

2. The combination in a gin feeder and cleaner, of a casing having an opening in its upper portion, a series of swinging bars forming normally a closure for said opening, and a rotatable feeder drum disposed in the casing to project by centrifugal force foreign matter heavier than the cotton against said bars with sufficient force to move them and permit the escape of such matter.

3. In a gin feeder and cleaner, a casing having a top inlet for cotton and bottom outlets for cotton and hulls, a rotatable spiked feeder drum disposed between said inlet and said outlets and movable to throw the cotton centrifugally downwardly toward said hull outlet, and picker rolls to close said hull outlet against the escape of cotton which picker rolls co-act with the feeder drum.

4. In a gin feeder and cleaner, a casing having a top inlet for cotton and bottom outlets for cotton and hulls, a rotatable spiked feeder drum disposed between said inlet and said outlets and movable to throw the cotton centrifugally downwardly toward said hull outlet, picker rolls to close said hull outlet against the escape of cotton which picker rolls co-act with the feeder drum, and picker ribs disposed below and adapted to co-act with the under side of said feeder drum, as and for the purposes described.

5. In a gin feeder and cleaner, a casing having a top inlet for cotton and bottom outlets for cotton and hulls, a rotatable spiked feeder drum disposed between said inlet and said outlets, a transverse set of huller ribs journaled below and movable to co-act with the under side of said feeder roll, and rotatable picker rolls co-acting with the under side of the feeder roll in advance of the huller ribs.

6. In a gin feeder and cleaner, a casing having a top inlet for cotton and bottom outlets for cotton and hulls, a rotatable spiked feeder drum disposed between said inlet and said outlets, a single row of huller ribs disposed below and adapted to co-act with the under side of said feeder roll between said outlets, and means to adjust and set said huller ribs toward and from said feeder roll.

7. In a gin feeder and cleaner, a feeder roll, and huller ribs co-acting therewith and comprising each a tapering longitudinally grooved face opposed to the cotton on the feeder roll.

8. In a gin feeder and cleaner, a feeder roll, and huller ribs substantially triangular in cross-section and tapered from base to tip, said ribs being set with a side face opposed to the oncoming cotton.

9. In a gin feeder and cleaner, a feeder roll, and huller ribs substantially triangular in cross-section and tapered from base to tip, said ribs being set with a side face opposed to the oncoming cotton, and said side face having a canvas groove extending from base to tip and having sharpened side edges along said face.

10. In a gin feeder and cleaner, a casing, a spiked feeder roll rotatable therein, and a series of light, hanging, outwardly swinging doors in the casing adapted to be opened by the impact of matter heavier than cotton, which is centrifugally impelled thereagainst by said roll, to permit its escape from the casing.

11. In a gin feeder and cleaner, a casing having a top cotton inlet and bottom outlets for hulls and cleaned cotton, a rotatable feeder roll therein, a back-board terminating above the hull outlet, a rotatable brush disposed between said back-board and the roll, and picker elements coacting with the roll.

12. In a gin feeder and cleaner, a casing having a top cotton inlet and bottom outlets for hulls and cleaned cotton, a rotatable feeder roll therein, a back-board terminating above the hull outlet and having its bottom end adjustable to and from the said roll, a rotatable brush disposed between said back-board and the roll, and picker elements coacting with the roll.

13. In a gin feeder and cleaner, a casing having a top cotton inlet and bottom outlets for hulls and cotton, a spiked feeder roll rotatable therein, a brush rotatable at side of the roll adjacent to the hull outlet, huller ribs co-acting with the roll between said outlets, and picker rolls co-acting with the feeder roll between the brush and picker ribs and adjacent to the hull outlet.

14. In a gin feeder and cleaner, a casing having a top cotton inlet and bottom outlets for hulls and cotton, a spiked feeder roll rotatable therein, a brush rotatable at side of the roll adjacent to the hull outlet, huller ribs co-acting with the roll between said outlets, picker rolls co-acting with the feeder roll between the brush and huller ribs and adjacent to the hull outlet, and a T-shaped bar interposed in the space between the picker rolls and the feeder roll with its wide face juxtaposed to the path of the spikes on the feeder roll.

15. The combination in a gin feeder having a rotatable spiked feeder roll and bottom cotton and hull outlets, of a rocker shaft mounted under the roll between said outlets and having fast thereon a series of huller ribs movable into working position between the spikes on said roll, and means to fasten said rocker shaft with its ribs set in the desired adjusted position relatively to said roll.

In testimony whereof I affix my signature.

JAMES M. PEERSON.

Witness:
NOMIE WELSH.